Oct. 22, 1974     V. V. LIKHITE     3,843,444

MEMBRANE SEPARATION PROCESS

Filed April 18, 1972

United States Patent Office 3,843,444
Patented Oct. 22, 1974

3,843,444
MEMBRANE SEPARATION PROCESS
Vilas V. Likhite, South Boston, Mass.
(39 Venner Road, Arlington, Mass. 02174)
Filed Apr. 18, 1972, Ser. No. 245,137
Int. Cl. C07g 7/00, 7/02
U.S. Cl. 195—66 R                                 9 Claims

ABSTRACT OF THE DISCLOSURE

Novel process and apparatus for effecting the concentration, separation or recovery of macromolecular substances having mutual attraction for one another and particularly of biological substances such as antibodies and antigens. The invention is based on the discovery that, for example, antigens and antibodies which are specific for one another will be preferentially attracted to opposite surfaces of thin semipermeable membranes and may be easily recovered therefrom in a state whereby they substantially maintain their original immunochemical characteristics.

BACKGROUND OF THE INVENTION

This invention relates to novel process and apparatus useful in purifying, concentrating and recovering such mutually attractive biological substances such as, for example, antigens and antibodies. By antigen is meant those materials such as precipitinogens, toxins, agglutinogens, opsogens, lysogens, and ferments or enzymes. By "antibodies" is meant those substances which tend to be mutually attracted to the antigen and can be observed clinically to have a neutralizing effect on an injected antigen. In general, the antigens may also be defined as those physiological agents, which, in an animal system, stimulate the production of a specific mechanism for defending against the antigen. The antibodies are an integral part of that defense mechanism.

There has long been a need for an improved means for recovering antibodies and antigens from physiologically-derived serums. The use of their mutual attraction is, of course, one means by which they may be concentrated. On the other hand, this attraction interferes with the purification and recovery of antigens. Moreover, when antigens and antibodies have been allowed to interact according to prior art procedures, and have been recovered and caused to dissociate as by immersion in salt solutions, and have been finally separated by conventional laboratory procedures, the physiological activity of the recovered products has been markedly reduced, say to the order of 5 to 20% of the original activity.

Thus, inventors have continued their efforts to find improved processes for isolation and purification of antibodies and antigens. For example, U.S. Pat. 3,652,761 to Weetall discussed a process whereby antibodies and antigens are coupled to an inorganic carrier whereby they become insolubilized.

However, until the present invention, there has been no method whereby antigens and specific antibodies can be recovered by a simple process and with substantially unimpaired physiological properties.

SUMMARY OF THE INVENTION

Therefore, it is an object of the invention to provide an improved process for purifying antibodies or for purifying antigens.

Another object of the invention is to provide an improved process for concentrating antibodies and antigens.

A further object of the invention is to provide novel apparatus useful in the aforesaid processes.

Still another object of the invention is the provision of novel articles useful in forming the apparatus of the invention and useful in the process of the invention.

Another object of the invention is to provide means for utilizing the mutual attractive nature of an antibody and an antigen to effect their selective isolation without substantial impairment of the immunotherapeutic qualities of said antigen and said antibody.

Another object of the invention is to provide processes for recovery, purification, and concentration of enzymes utilizing therefor the selective attractive properties of enzyme substrates.

Other objects of the invention will be obvious to those skilled in the art on reading this application.

The above objects have been substantially achieved by utilization of the discovery of thin semipermeable polymeric films. When utilized as barrier films between a liquid medium containing antigens and a liquid medium containing antibodies which are specific for said antigens, such films will provide a surface for selective collection of antibodies and antigens on opposite sides thereof. The adherence of the antibody and antigen is reversible by a simple washing step, and the primary physiological properties of the antibodies and antigens are substantially unaffected by the collection and washing procedures. The effective pore size of such films during the processing step should be less than the effective diameter of the smaller biological material being attracted thereto. By "pore" the applicant does not mean to be bound by such concepts as mechanical holes, but to mean any mechanism by which effective interaction between mutually attractive biological substances becomes sufficiently great to be manifested through the film being used.

The mechanism by which the invention works is not precisely known. Many models have been worked out to explain the selective attraction of antigens and the antibodies selective thereto, but most of these models are primarily to rationalize the result, rather than explain the interaction with particularity. It may be that very small-sized matter (say ionic or molecular constituents associated with an antibody or antigen) can become trapped in interstices of the film with a much smaller barrier between it and the opposing liquid medium than the nominal thickness of the film would suggest, and thereby exert a relatively large attraction for the opposing antigen or antibody. The inventor, however, is not to be bound by such speculation.

A wide variety of films work well in the process of the invention. For example, those cellulosic films normally used for laboratory dialysis work are suitable for use in process of the invention. So are the poly (vinyl chloride-vinylidene chloride) films so commonly used in household applications and sold under the trade designation Saran by the Dow Chemical Company. In general, the films are conveniently less than about 0.10 mm. thick, but the actual limiting thickness, no doubt, depends on factors such as the permeability of the film rather than the nominal film thickness or even the material from which the film is manufactured. Among materials which may be used in forming said films are all, or very nearly all, those organic polymeric materials which are now utilized in making membranes for dialysis, saline water conversion, ultrafiltrations, and like processes.

By "barrier film" is meant a semipermeable barrier of any geometrical configuration. For example, in addition to sheet materials the film can be in the form of a closed sphere or other such three-dimensional form. One of an antibody or antigen would normally be encapsulated within the sphere and form means for attracting the other material to the outer surface thereof. Indeed, utilization of a column packed with such spheres is a particularly desirable means for effecting separations according to the invention: the antibody or antigen to be recovered is passed through the column. When the column is "saturated," the antibody is rinsed off and collected.

Another type of film is that comprising a liquid which is substantially immobilized within the interstices, or on, a membrane. Indeed, many films have sufficient porosity to meet this criteria when immersed in fluid, but particular emphasis in this paragraph is placed on films wherein a liquid is particularly utilized to provide an increased attractive force between antigen and antibody and yet maintain a barrier against their joinder.

The antibodies which are especially advantageously processed by the invention are those materials associated with the gamma globulin fraction of blood and thus are macromolecular in size.

Among those enzymes most advantageously treated by the process of the invention are coagulating enzymes, glycolytic enzymes, hydrolytic enzymes, proteolytic enzymes, blood enzymes and the like.

In general, the chemicals advantageously processed by the instant invention are macromolecular, i.e. those having a molecular weight in excess of 1000 and are biologics, i.e. compounds derived from living organisms.

ILLUSTRATIVE EXAMPLE OF THE INVENTION

In order to point out more fully the nature of the present invention, the following specific examples are given as illustrative embodiments of the present process and products produced thereby.

In the Drawings—

Figure 3:
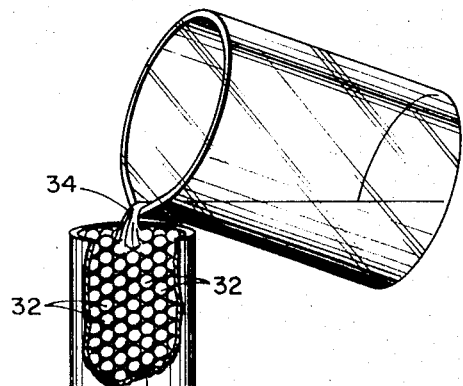
FIG. 3 is a cross-section view of a liquid-containing capsule.
Figure 3:
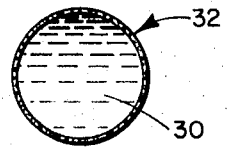
Figure 1:
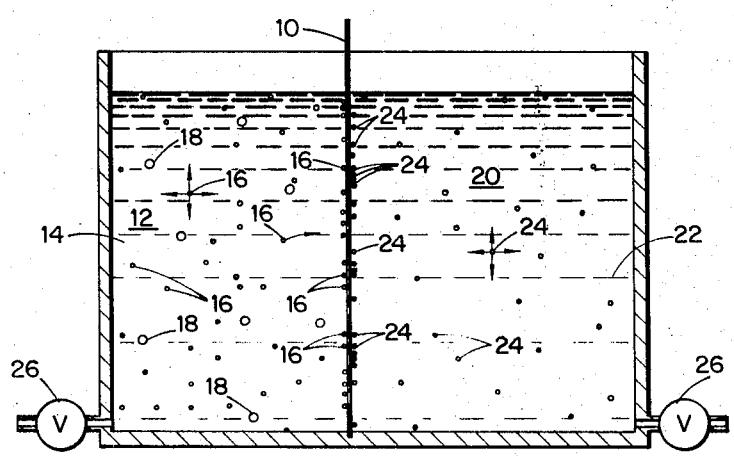
FIG. 1 is a cross-section view of the apparatus used in the process of the invention showing the semipermeable film utilized therein.

Referring to FIG. 1, it is seen that a semipermeable membrane 10 is used as a a barrier between two liquid masses. Liquid 12 in zone 14 comprises a processed blood fraction known to contain antibodies 16 as well as other extraneous blood components 18. Liquid 20 in zone 22 comprises an antigen 24 specific for the antibody 16 which one desires to collect.

It is believed antigen 24 and antibodies 16 tend to circulate more or less at random and tend to adhere to membrane 10 only when they come in close contact therewith. When collection is complete (and one can achieve very nearly 100% collection of antibodies and antigens from dilute media), the liquid media is drained through valves 26 and the antigens and antibodies are collected by first washing off the membrane surfaces with physiological saline and then removing the antigen and antibodies by using a hypertonic saline wash at 37° C.

Figure 2:
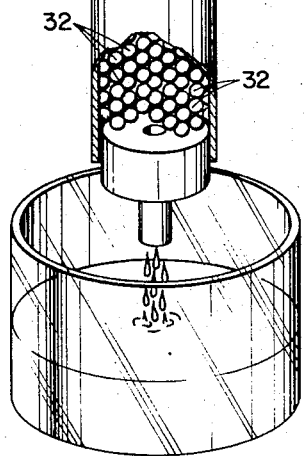
FIG. 2 is a perspective view of alternate apparatus used in the process of the invention.

FIG. 2 shows a particularly advantageous apparatus for concentration of an antibody or antigen. An encapsulated antigen-containing liquid 30 is contained in small hollow organic-polymer capsules 32. These capsules 32 are placed in a column 36 and the antibody bearing material 34 is passed therethrough. The antibodies collect on the particle and can be washed and collected as were those collected on the membrane of FIG. 1.

Example 1

This example illustrates the process of the invention to obtain an antibody to bovine serum albumin antigen. The antigen can be purchased commercially in a sterile condition.

About 3.5 grams of the bovine serum antigen used is placed in 100 cc. of physiological saline (0.9% solution of NaCl in water). About 0.25 cc. of this mixture is used to inject a rabbit, causing the rabbit to build up a supply of a specific antibody to the bovine albumin serum in its blood.

Such injections are carried out weekly for five weeks during which time the rabbit is developing antibodies to the albumin. On the sixth week, 9.5 mg. of the antigen is suspended in sterile saline and injected intravenously into the marginal vein of the rabbit. Three days later, the rabbit is bled, e.g. by the central artery of the ear. Usually, about 70 to 150 cc. of blood is obtained from each rabbit. Typically, the antibody titer of the blood so obtained will be about 1:2000.

At this point, one may either heparinize the blood or let it clot for further processing. In this example, the blood is allowed to clot and the serum is preserved at about 4° C. Further processing is carried out at this reduced temperature as follows:

The serum is placed in a serile glass container and an equal volume of physiological saline is added thereto. Next, a supersaturated solution of ammonium sulfate, equal in volume to the plasma-saline mixture, is added dropwise to get a final concentration of 40 to 50% saturation of the ammonium sulfate. The resulting mixture is allowed to set for 24 hours during which time globulins are precipitated.

The globulins are recovered by centrifuging at about 2000 r.p.m. on an ordinary laboratory centrifuge for about 15 minutes. The supernatant liquid containing albumin and other blood components is discarded. The precipitate contains the antibodies which are to be used in the product and process of the invention.

This antibody containing precipitate is dissolved in phosphate-buffered saline, then placed in dialysis bags and dialyzed against phosphate-buffered saline according to known procedures until the anti-body-containing solution is substantially free of the ammonium sulfate. Frequent, say hourly charges of the saline being used to absorb the ammonium sulfate should be made during the early stages of the dialysis. The dialysis may be terminated after about 24 hours.

The resulting dialyzed solution contains the antibodies which can be conveniently recovered by means known to the art.

The antibody was concentrated to a titer of about 1:4000. This can be done by placing the dialysis bag in a cold, dry atmosphere and allowing the concentration to take place.

A volume of 20 ml. of the resulting antibody-bearing serum having a titer of 1:4000 is treated as follows:

This antibody-bearing serum is diluted with approximately an equal amount of physiological saline solution and the resultant liquid is placed in one side of a 2-compartment box similar to that shown in FIG. 1. A liquid containing about 3 to 4 grams of bovine serum albumin in 100 cc. of physiological saline is placed on the opposite side of the membrane. The membrane itself is a cellulose acetate membrane of the type generally used for dialysis of physiological solutions. Such membranes are available from Willis Corporation in Rochester, New York. This membrane is 0.10 mm. in thickness.

The exposed area of the membrane, on each side, is about 12 square inches. The two quantities of liquid are kept in contact with the membrane for 24 hours at 4° C.

After the 24-hour period, the two liquid portions are drawn out of their compartments. The compartments and membrane are then rinsed with physiological saline, using about 100 cc. of this liquid on each side of the membrane. This washes most of the non-antibody protein off the membrane. Then, hypertonic saline at 37° C. is used to wash the antibody from the membrane surface.

Based on the titer of the serum material before the separation and the titer of the collected material, about 85% of the antibody in the serum is recovered.

Example 2

The same procedure is used as was used in Example 1, except that, instead of going through any clotting step, the serum is placed directly into the 2-compartment box, and subjected to the processing therein. Thus, the processed material contains albumins and other non-antibody globulin materials. These, however, are not selectively adherent to the membrane surface which has antigen on the opposite side thereof. Consequently a major purification as well as a concentration is effected when the washing and collecting steps are completed.

Examples 3 Through 10

The same basic procedure was used to recover, purify and concentrate solutions of specific antibodies which were produced by the following antigens or antigen-stimulating materials.

Salmonella
Diphtheria toxoid
Tetanus toxoid
Human albumin
Escherichia coli bacteria
Beta hymolytic streptococcus bacteria
Staphylococcus aureus bacteria
Ehrlich's ascites mice tumor cells Highly satisfactory concentrations of the antibodies were achieved, often approaching a 100% recovery from the serum treated. In each case, a specific antigen was used in the liquid medium on the other side of the membrane.

When no antigen was utilized in the liquid solution on the opposite side of the membrane from the antibody-bearing liquid, no significant increased concentrations of antibody were obtainable from the surface of the membrane.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

What is claimed is:

1. A process for selectively recovering a biologically-active organic compound from a liquid medium comprising the steps of:
   (a) placing a first liquid medium containing a first biologically-active organic compound in a container on one side of a thin semipermeable barrier film;
   (b) placing a second liquid medium containing a second biologically-active compound having specific attraction for said first compound in the container on the other side of the thin barrier film, said film forming a physical barrier against joinder of said first compound to said second compound;
   (c) removing said first liquid medium from the container and leaving said first compound adhered to said one side of the film; and
   (d) recovering said first compound from said one side of the film.

2. A process as defined in claim 1 wherein said first biologically-active compound is an antibody component of the gamma globulin portion of blood.

3. A process as defined in claim 1 wherein said first biologically-active compound is an enzyme.

4. A process for selectively recovering antibodies from a first liquid medium comprising the steps of:
   (a) placing a first liquid medium containing antibodies in a container on one side of a thin semipermeable barrier film;
   (b) placing a second liquid medium containing antigens having specific attraction for said antibodies in the container on the other side of the thin barrier film, said film forming a physical barrier against joinder of said antibodies and said antigens;
   (c) removing said first liquid medium from the container and leaving said antibodies adhered to said one side of the film; and,
   (d) recovering said antibodies from said one side of the film.

5. A process as defined in claim 4 wherein the recovering step is accomplished by washing said one side of the film with a wash solution.

6. A process as defined in claim 5 wherein said wash solution comprises a first rinse of physiological saline and a second rinse of hypertonic saline.

7. A process as defined in claim 4 further characterized by additionally removing said second liquid medium from the container and leaving said antigens adhered to said other side of the film, and recovering said antigens from said other side of the film.

8. A process as defined in claim 4 wherein the film is in the form of a flat sheet.

9. A process as defined in claim 4 wherein the film is in the form of at least one sphere.

References Cited
UNITED STATES PATENTS

| 3,652,761 | 3/1972 | Weetall | 424—12 |
| 3,639,559 | 2/1972 | Tax | 424—12 |

OTHER REFERENCES

Silman et al., Annual Review of Biochemistry, 1966, pp. 873-907, pp. 892-897 on relied on.

LIONEL M. SHAPIRO, Primary Examiner

U.S. Cl. X.R.

260—112 R; 424—12